United States Patent
Shih et al.

(10) Patent No.: US 8,537,207 B2
(45) Date of Patent: Sep. 17, 2013

(54) VIDEO-AUDIO PLAYING SYSTEM RELATING TO 2-VIEW APPLICATION AND METHOD THEREOF

(75) Inventors: Chih-Chang Shih, Taoyuan County (TW); Yang-Ching Cheng, Hsinchu (TW); Sheng-Ju Ho, Hsinchu (TW); Chi-Hsien Chung, New Taipei (TW); Wan-Ting Chen, Taichung (TW); Cheng-Han Tsao, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/253,058

(22) Filed: Oct. 4, 2011

(65) Prior Publication Data

US 2012/0281144 A1  Nov. 8, 2012

(30) Foreign Application Priority Data

May 4, 2011  (TW) .............................. 100115614 A

(51) Int. Cl.
*H04N 13/04*  (2006.01)
(52) U.S. Cl.
USPC ........................................................ 348/55
(58) Field of Classification Search
USPC ................ 348/581, 563, 564, 569, 333.2, 54,
348/55, 552, 553; 345/6–9, 87; 725/43
See application file for complete search history.

(56) References Cited

U.S. PATENT DOCUMENTS

| | | | | |
|---|---|---|---|---|
| 5,825,340 | A | * | 10/1998 | Torizuka et al. .................. 345/8 |
| 5,945,965 | A | * | 8/1999 | Inoguchi et al. .................. 345/6 |
| 6,115,058 | A | * | 9/2000 | Omori et al. ..................... 348/45 |
| 7,855,743 | B2 | * | 12/2010 | Sako et al. ............... 348/333.02 |
| 7,973,773 | B2 | * | 7/2011 | Pryor ............................. 345/173 |
| 8,253,861 | B2 | * | 8/2012 | Yoshimoto et al. ........... 348/564 |
| 8,310,527 | B2 | * | 11/2012 | Ko et al. .......................... 348/55 |
| 8,370,873 | B2 | * | 2/2013 | Shintani ......................... 725/39 |
| 8,402,502 | B2 | * | 3/2013 | Meuninck et al. ............ 725/133 |
| 2006/0012593 | A1 | * | 1/2006 | Iriguchi et al. ................ 345/204 |
| 2010/0045928 | A1 | * | 2/2010 | Levy .............................. 351/158 |
| 2010/0073466 | A1 | * | 3/2010 | Jones et al. ..................... 348/51 |
| 2011/0134231 | A1 | * | 6/2011 | Hulvey et al. .................. 348/56 |
| 2011/0234605 | A1 | * | 9/2011 | Smith et al. .................... 345/522 |
| 2012/0190439 | A1 | * | 7/2012 | Nourbakhsh ................... 463/31 |

FOREIGN PATENT DOCUMENTS

| | | |
|---|---|---|
| CN | 101141567 | 3/2008 |
| TW | 594184 | 6/2004 |
| TW | 200932029 | 7/2009 |
| TW | 201004373 | 1/2010 |
| TW | I320290 | 2/2010 |

OTHER PUBLICATIONS

"First Office Action of China Counterpart Application", issued on Apr. 15, 2013, p. 1-p. 5, in which the listed reference was cited.

* cited by examiner

*Primary Examiner* — Paulos M Natnael
(74) *Attorney, Agent, or Firm* — Jianq Chyun IP Office

(57) ABSTRACT

A video-audio playing system relating to 2-view application and a method thereof are provided. In the present invention, sound signals respectively corresponding to two independent image frames are captured and played in coordinating with the displaying of these two independent image frames. Accordingly, two users can respectively watch two image frames which are different and irrelevant each other in the same display, and further respectively hear sound effects of the respective image frames at the same time.

18 Claims, 4 Drawing Sheets

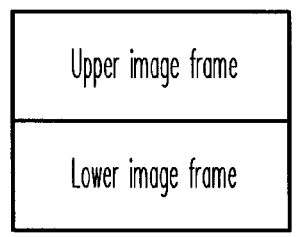
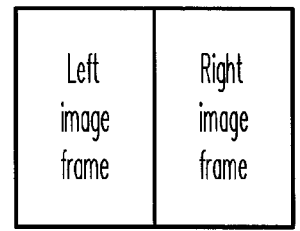
FIG. 3A  FIG. 3B
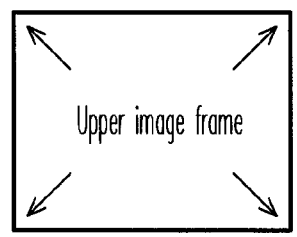
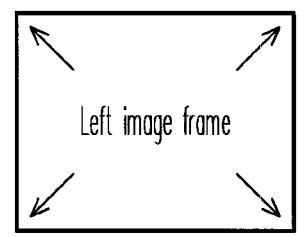
FIG. 4A  FIG. 4B
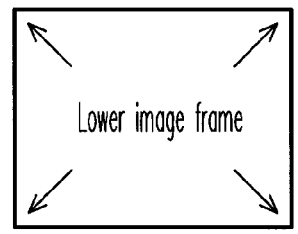
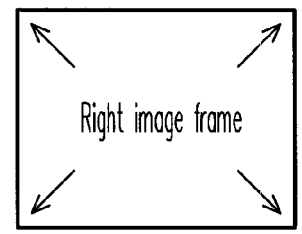
FIG. 4C  FIG. 4D

VIDEO-AUDIO PLAYING SYSTEM RELATING TO 2-VIEW APPLICATION AND METHOD THEREOF

CROSS-REFERENCE TO RELATED APPLICATION

This application claims the priority benefit of Taiwan application serial no. 100115614, filed on May 4, 2011. The entirety of the above-mentioned patent application is hereby incorporated by reference herein and made a part of specification.

BACKGROUND OF THE INVENTION

1. Field of the Invention

The present invention relates to a video-audio playing system and a method thereof, more particularly, to a video-audio playing system relating to 2-view application and a method thereof.

2. Description of the Related Art

At some specific applications, a single display is used to display different channels, so as to make different viewers watch simultaneously different image frames. In other words, two users can respectively watch two image frames which are different and irrelevant each other in the same display, for example, one of users only watches an image frame relating to "news", and the other of users only watches an image frame relating to "cartoon". However, these two users cannot respectively hear sound effects of the respective watched image frames at the same time. In other words, these two users may simultaneously hear the sound effect of the image frame relating to "news", or may simultaneously hear the sound effect of the image frame relating to "cartoon".

SUMMARY OF THE INVENTION

The present invention is directed to a video-audio playing system relating to 2-view application and a method thereof, wherein at least some of the problems confronted by the prior art could be effectively mitigated.

The present invention provides a video-audio playing system including a display unit, a processing unit and a sound playing unit. The display unit may be used for simultaneously or time-divisionally displaying at least two independent image frames, so as to make at least two users respectively watch the image frames through corresponding glasses. The processing unit may be used for controlling the display unit to display the image frames, and capturing sound signals of the respective image frames. The sound playing unit may be used for receiving the sound signals captured by the processing unit, and respectively playing the received sound signals in coordinating with the image frames, so as to make each user hear sound effect of the watched image frame.

The present invention also provides a video-audio playing method including displaying simultaneously or time-divisionally at least two independent image frames, so as to make at least two users respectively watch the image frames through corresponding glasses; and capturing sound signals of the respective image frames, and playing respectively the captured sound signals in coordinating with the image frames, so as to make each user hear sound effect of the watched image frame.

In the present invention, by capturing sound signals respectively corresponding to two independent image frames, and playing the captured sound signals in coordinating with the displaying of these two independent image frames. Accordingly, two users can respectively watch two image frames which are different and irrelevant each other in the same display, and further respectively hear sound effects of the respective image frames at the same time.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A and 3B are respectively a diagram of two independent image frames simultaneously displayed by a display unit 101 according to another embodiment of the present invention.

FIGS. 4A to 4D are respectively a diagram of performing a process of proportional full-screen scaling on a separated image frame according to an embodiment of the present invention.

DESCRIPTION OF THE PREFERRED EMBODIMENTS

Figure 1:
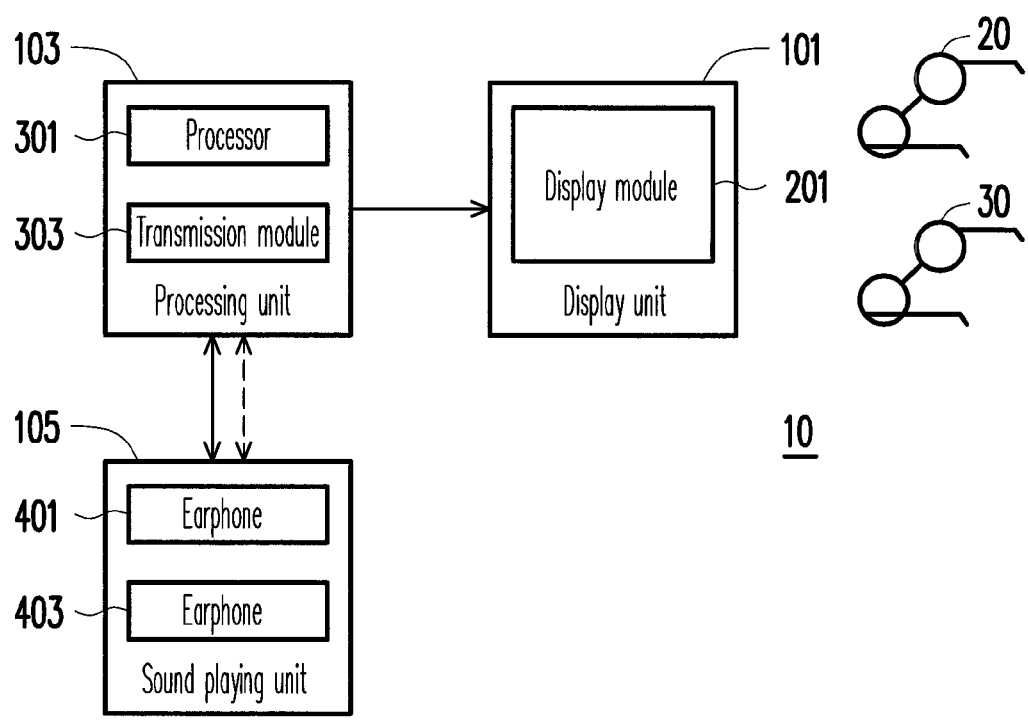
FIG. 1 is a block diagram of a video-audio playing system 10 relating to 2-view application according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a video-audio playing system 10 relating to 2-view application according to an embodiment of the present invention. Referring to FIG. 1, the video-audio playing system 10 may be a display system, but not limited thereto. The video-audio playing system 10 may include a display unit 101, a processing unit 103 and a sound playing unit 105. The display par 101 may be used for simultaneously or time-divisionally displaying at least two independent image frames, so as to make at least two users respectively watch the two independent image frames through corresponding glasses 20 and 30. In other words, the display unit 101 may be used for displaying at least two types of image frames, wherein each type of the image frames is shown on corresponding glasses 20 and 30.

Figure 2A:
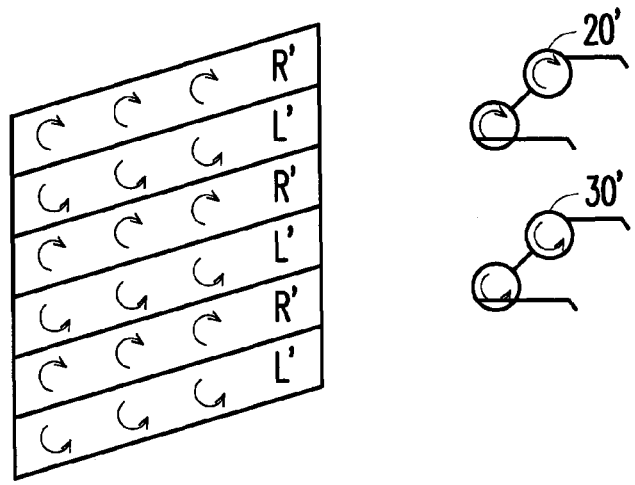
FIG. 2A is a diagram of two independent image frames R' and L' simultaneously displayed by a display unit 101 and two corresponding glasses 20' and 30' thereof according to an embodiment of the present invention.

For example, FIG. 2A is a diagram of two independent image frames R' and L' simultaneously displayed by the display unit 101 and two corresponding glasses 20' and 30' thereof according to an embodiment of the present invention. Referring to FIGS. 1 and 2A, in the present embodiment, the display unit 101 includes a display module 201. The display module 201 is used for simultaneously displaying two independent image frames R' and L' in response to a stereo display principle of film patterned retarder. Of course, the glasses 20' and 30' are designed by the stereo display principle of film patterned retarder. Accordingly, the user wearing the glasses 20' can only watch the image frame R', and cannot watch the image frame L' at one time; in addition, the user wearing the glasses 30' can only watch the image frame L', and cannot watch the image frame R' at one time.

Figure 2B:
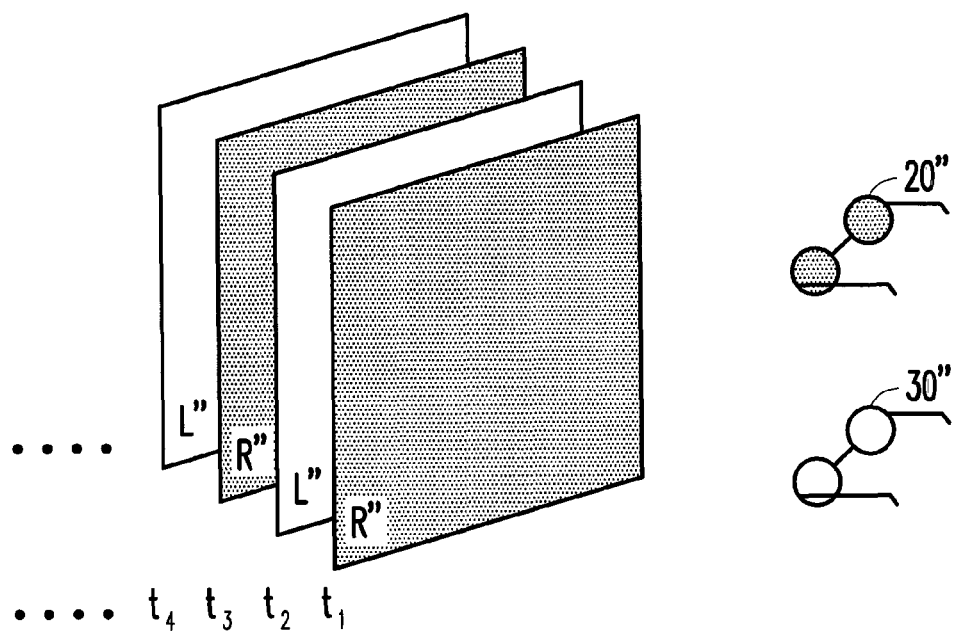
FIG. 2B is a diagram of two independent image frames R" and L" time-divisionally displayed by a display unit 101 and two corresponding glasses 20" and 30" thereof according to an embodiment of the present invention.

For further example, FIG. 2B is a diagram of two independent image frames R" and L" time-divisionally displayed by the display unit 101 and two corresponding glasses 20" and 30" thereof according to an embodiment of the present invention. Referring to FIGS. 1 and 2B, similarly, the display unit 101 includes the display module 201. The display module 201 is used for time-divisionally (i.e. at different time points $t_1$, $t_2$, $t_3$, $t_4$, ... ) displaying two independent image frames R" and L" in response to a stereo display principle of shutter glasses. Of course, the glasses 20" and 30" are designed by the stereo display principle of shutter glasses. Accordingly, the user wearing the glasses 20" can only watch the image frame R" at odd time points $t_{odd}$ (i.e. $t_1$, $t_3$, ... ); in addition, the user wearing the glasses 30" can only watch the image frame L" at even time points $t_{even}$ (i.e. $t_2$, $t_4$, ... ).

It is thus clear that two users respectively wearing the glasses 20'/20", 30'/30" can respectively watch two image frames which are different and irrelevant each other in the same display module 201, for example, user wearing the glasses 20'/20" can only watch the image frame relating to "news", and user wearing the glasses 30'/30" can only watch the image frame relating to "cartoon".

In the other hands, the processing unit 103 at least includes a processor 301 and a wire or wireless transmission module 303. The processor 103 may be used for controlling the display unit 101, so as to make the display module 201 of the display unit 101 display two independent image frames (for example, the image frames R'/R", L'/L"). Meanwhile, the processor 301 may be used further for capturing or processing sound signals of the respective image frames. Furthermore, the sound playing unit 105 may be used for receiving the sound signals captured/processed by the processor 301, and respectively playing the received sound signals relating to the two independent (or the respective types of) image frames in coordinating/coordination with the displaying of the two independent image frames, so as to make each user hear sound effect of the watched image frame.

To be specific, the processing unit 103 may communicate with the sound playing unit 105 in a wire (for example, cable) or wireless (for example, bluetooth, but not limited thereto) transmission manner And, the sound playing unit 105 includes at least two wire or wireless earphones 401, 403. Accordingly, the sound signals of the respective image frames from capturing by the processor 301 of the processing unit 103 can be transmitted to the earphones 401 and 403 through the wire or wireless transmission module 303, so as to respectively play in coordinating with the displaying of the display module 201 of the display unit 101, and thus making each user hear sound effect of the watched image frame.

Obviously, in the video-audio playing system 10 of the present embodiment, two users can respectively watch two image frames which are different and irrelevant each other in the same display, and further respectively hear sound effects of the respective image frames at the same time. For example, user wearing the glasses 20/20'/20" can watch the image frame relating to "news" and further hear the sound effect of the watched image frame through the wire or wireless earphone 401; meanwhile, user wearing the glasses 30/30'/30" can watch the image frame relating to "cartoon" and further hear the sound effect of the watched image frame through the wire or wireless earphone 403. Accordingly, the video-audio playing system 10 of the present embodiment can satisfy the enjoyment of video and audio of two users at the same time.

In the other hands, in the condition of that two independent image frames (or the two types of image frames) are displayed simultaneously by the display module 201 of the display unit 101, for example, two segmented image frames of upper-and-lower (as shown in FIG. 3A) or left-and-right (as shown in FIG. 3B) are displayed under two users play game through the video-audio playing system 10. The processor 301 of the processing unit 103 may firstly perform a signal separation on the two displayed-segmented image frames of upper-and-lower or left-and-right, and then perform a process of proportional full-screen scaling on each of the separated upper/left image frame and lower/right image frame, as shown in FIGS. 4A to 4D.

Thereafter, the processor 301 of the processing unit 103 may further perform a signal recombination on the upper/left image frame and lower/right image frame which have performed the process of proportional full-screen scaling in response to one of the stereo display principle of film patterned retarder and the stereo display principle of shutter glasses. For example, in response to the stereo display principle of film patterned retarder, the processor 301 of the processing unit 103 may perform a line interlacing on the upper/left image frame and lower/right image frame which have performed the process of proportional full-screen scaling. For further example, in response to the stereo display principle of shutter glasses, the processor 301 of the processing unit 103 may perform a time interlacing on the upper/left image frame and lower/right image frame which have performed the process of proportional full-screen scaling. It is thus clear that the processor part 103 is capable of performing the signal separation and the signal recombination on the upper/left image frame and lower/right image frame.

Accordingly, two users respectively wearing the glasses 20/20'/20", 30/30'/30" can respectively watch two image frames which are different and irrelevant each other. Moreover, the image frames respectively watched by two users respectively wearing the glasses 20/20'/20", 30/30'730" would not generate deformation and distortion due to the upper/left image frame and lower/right image frame have performed the process of proportional full-screen scaling by the processor 301 of the processing unit 103 in advance. Therefore, the display quality of the display module 201 of the display unit 101 can be significantly improved. Of course, in the other embodiment of the present invention, the processor 301 of the processing unit 103 is capable of processing signals of two channels of a single cable. Even, the processor 301 of the processing unit 103 is capable of processing two different signal sources, for example, signals of cable and HDMI, but not limited thereto.

Figure 5:
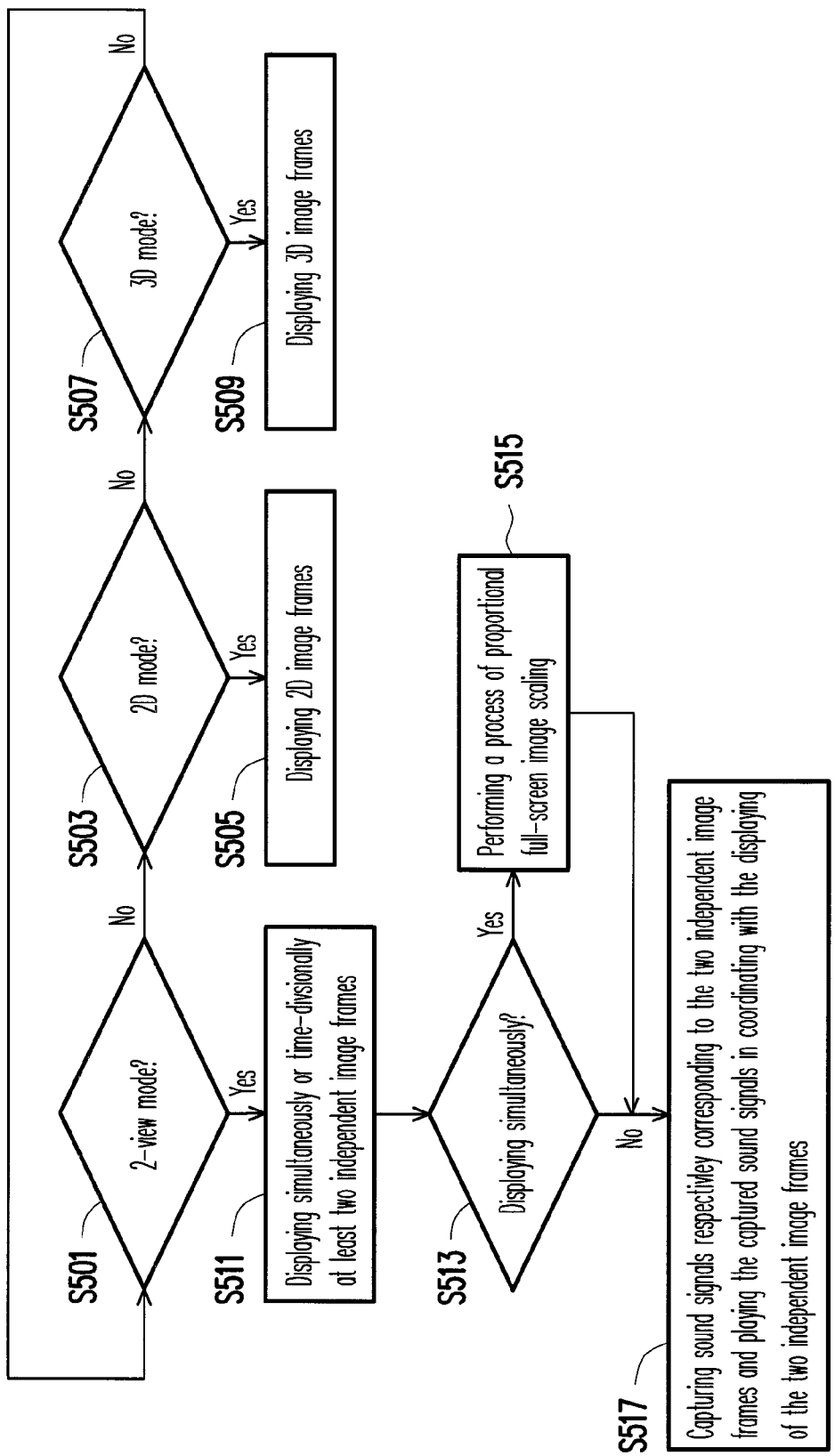
FIG. 5 is a flow chart of a video-audio playing method relating to 2-view application according to an embodiment of the present invention.

Based on the disclosure/teaching of the above embodiments, FIG. 5 is a flow chart of a video-audio playing method relating to 2-view application according to an embodiment of the present invention. Referring to FIG. 5, the video-audio playing method of the present embodiment includes the following steps.

Whether a 2-view mode is selected is determined (step S501).

When it is determined that the 2-view mode is not selected, whether a 2D mode is selected is determined (step S503).

When it is determined that the 2D mode is selected, 2D image frames are displayed (step S505); otherwise, whether a 3D mode is selected is determined (step S507).

When it is determined that the 3D mode is selected, 3D image frames are displayed (step S509); otherwise, it is returned to the step S501.

When it is determined that the 2-view mode is selected, at least two independent image frames are simultaneously or time-divisionally displayed in response to the stereo display principle of film patterned retarder or the stereo display principle of shutter glasses, so as to make at least two users respectively watch the two independent image frames through corresponding glasses (step S511).

Whether the two independent image frames are displayed simultaneously is determined (step S513).

When it is determined that the two independent image frames are displayed simultaneously, a process of proportional full-screen scaling is respectively performed on the two independent image frames, so as to avoid the image frames respectively watched by these two users generating deformation and distortion (step S515).

When it is determined that the two independent image frames are not displayed simultaneously, or after the two independent image frames have performed the process of proportional full-screen scaling, sound signals respectively corresponding to the two independent image frames are captured and played in coordinating/coordination with the displaying of these two independent image frames, so as to make each user hear sound effect of the watched image frame (step S517).

In summary, in the present invention, by capturing sound signals respectively corresponding to two independent image frames, and playing the captured sound signals in coordinating with the displaying of these two independent image frames. Accordingly, two users can respectively watch two image frames which are different and irrelevant each other in the same display, and further respectively hear sound effects of the respective image frames at the same time. Thus, the video-audio playing system and the method thereof submitted by the present invention can satisfy the enjoyment of video and audio of at least two users at the same time.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A video-audio playing system, comprising:
    a display unit, for displaying at least two types of image frames with different image contents from each other time-divisionally or spatial-divisionally, wherein the at least two types of the image frames are respectively shown on two different glasses configured to respectively be worn by two different users;
    a processing unit, for controlling the display unit to display the image frames, and processing sound signals of the respective image frames; and
    a sound playing unit, for receiving the sound signals processed by the processing unit, and respectively playing the received sound signals to the two different users in coordination with the displaying of the image frames, wherein the sound signals are related to the respective types of image frames.

2. The video-audio playing system according to claim 1, wherein when the display unit displays the two types of image frames, the processing unit is further performing a process of proportional full-screen scaling on the respective image frames.

3. The video-audio playing system according to claim 2, wherein the processing unit is capable of performing a signal separation and a signal recombination on the image frames.

4. The video-audio playing system according to claim 1, wherein the processing unit communicates with the sound playing unit in a wire or wireless transmission manner.

5. The video-audio playing system according to claim 1, wherein the processing unit comprises:
    a transmission module; and
    a processor, for controlling the display unit to display the image frames, and transmitting the sound signals to the sound playing unit through the transmission module.

6. The video-audio playing system according to claim 5, wherein the transmission module is a wire or wireless transmission module.

7. The video-audio playing system according to claim 1, wherein the sound playing unit comprises at least two wire or wireless earphones respectively for playing the sound signals.

8. The video-audio playing system according to claim 1, wherein the display unit comprises at least a display module for displaying the image frames.

9. A video-audio playing method, comprising:
    displaying spatial-divisionally or time-divisionally at least two independent image frames with different image contents from each other, so as to make at least two different users respectively watch the at least two types of image frames through two different glasses configured to respectively be worn by the two different users; and
    capturing sound signals of the respective image frames, and playing respectively the captured sound signals related to the respective types of image frames to the two different users in coordination with the displaying of the respective image frames.

10. The video-audio playing method according to claim 9, wherein when the image frames are simultaneously displayed, the method further comprises:
    performing a proportional full-screen scaling on the respective image frames.

11. A video-audio playing system, comprising:
    a display part, for displaying at least two image frames with different image contents from each other time-divisionally or spatial-divisionally, wherein the at least two image frames are respectively shown on two different glasses configured to respectively be worn by two different users;
    a processing part, for controlling the display part to display the image frames, and capturing sound signals of the respective image frames; and
    a sound playing part, for receiving the sound signals captured by the processing part, and respectively playing the received sound signals to the two different users in coordination with the displaying of the image frames, wherein the sound signals are related to sound effects of the respective image frames.

12. The video-audio playing system according to claim 11, wherein when the display part simultaneously displays the image frames, the processing part is further for performing a process of proportional full-screen scaling on the respective image frames.

13. The video-audio playing system according to claim 12, wherein the processing part is capable of performing a signal separation and a signal recombination on the image frames.

14. The video-audio playing system according to claim 11, wherein the processing part communicates with the sound playing part in a wire or wireless transmission manner.

15. The video-audio playing system according to claim 11, wherein the processing part comprises:
- a transmission module; and
- a processor, for controlling the display part to display the image frames, and transmitting the sound signals to the sound playing part in a wire or wireless transmission manner through the transmission module.

16. The video-audio playing system according to claim 15, wherein the transmission module is a wire or wireless transmission module.

17. The video-audio playing system according to claim 11, wherein the sound playing part comprises at least two wire or wireless earphones respectively for playing the sound signals.

18. The video-audio playing system according to claim 11, wherein the display part comprises at least a display module for displaying the image frames.

\* \* \* \* \*